No. 637,657. Patented Nov. 21, 1899.
M. PEDERSEN.
PEDAL FOR CYCLES.
(Application filed June 20, 1898.)
(No Model.)
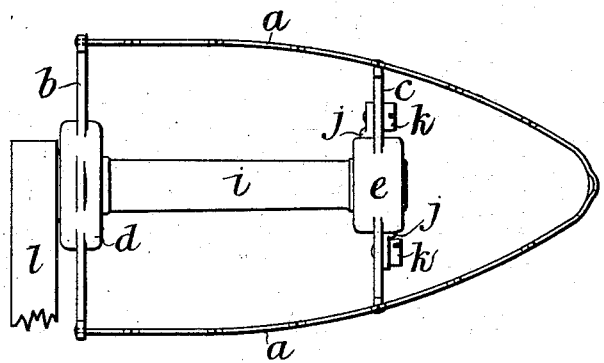
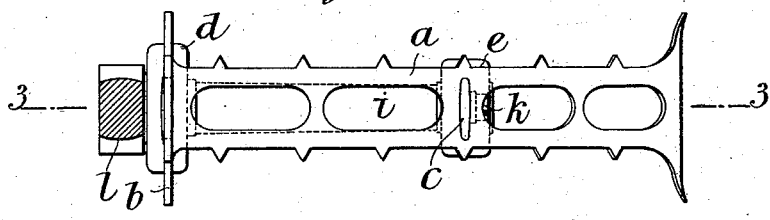
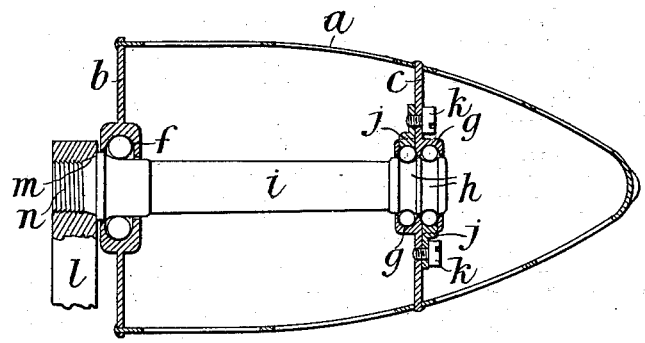
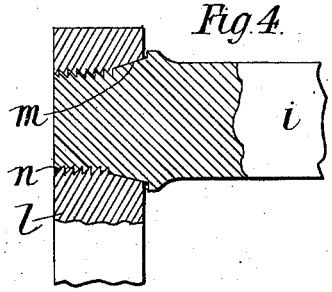
Witnesses.
Inventor.

UNITED STATES PATENT OFFICE.

MIKAEL PEDERSEN, OF DURSLEY, ENGLAND.

PEDAL FOR CYCLES.

SPECIFICATION forming part of Letters Patent No. 637,657, dated November 21, 1899.

Application filed June 20, 1898. Serial No. 683,993. (No model.)

*To all whom it may concern:*

Be it known that I, MIKAEL PEDERSEN, a subject of the King of Denmark, residing at Dursley, England, have invented new and useful Improvements in and Connected with the Pedals of Cycles, (for which I have applied for a patent in Great Britain, No. 27,769, dated November 25, 1897,) of which the following is a specification.

My invention relates to the pedals of cycles and comprises the novel construction of the parts hereinafter described, whereby I provide a pedal which is lighter and less liable to injury than pedals as heretofore constructed.

In the accompanying drawings, Figure 1 is a plan view of a pedal constructed according to my invention, and Fig. 2 is an elevation of the same. Fig. 3 is a section on the line 3 3, Fig. 2. Fig. 4 is a sectional view of a detail drawn to an exaggerated scale.

A pedal constructed according to my invention has the bearing-surface for the feet formed of a thin steel plate $a$, bent at the center and united at the two ends by riveting or otherwise to a cross-bar $b$, so that the pedal is of a somewhat triangular form in plan, the base of the triangle being the cross-bar $b$ and the sides of the triangle the two sides of the bent plate $a$. At a point between the base of the triangle and the apex is another cross-bar $c$, which serves to brace the two sides of the pedal together, the ends of the said cross-bar being riveted in suitable apertures in the sides of the plate $a$. The cross-bars $b$ and $c$ have in them sockets or bosses $d$ $e$, respectively, bored out to form ball-races $f$ $g$, the said races being preferably shaped substantially as shown in Fig. 3, so that the weight applied to the pedal is carried by the balls vertically instead of more or less at the sides, as is the case when cups and cones are used. As shown, the boss $e$ of the cross-bar $c$ has in it two races $g$ $g$, which coöperate with corresponding grooves $h$ $h$ in the crank-pin $i$. If desired, however, one race could be used.

In applying the pedal to the crank-pin the pedal is held with the point or apex downward, and then the outer end of the crank-pin is inserted into the boss $d$, and while in this position the balls which run in the race $f$ are inserted between the said crank-pin and the sides of the aperture in the said socket. The balls having been thus placed in position the crank-pin is pushed home, so that the end thereof, with the two grooves $h$ $h$, enters the socket $e$. Balls are then introduced into the two sets of grooves $g$ $g$ $h$ $h$ through holes provided in the boss $e$, the said balls by engaging with the two sets of grooves serving to prevent the pedal from becoming detached from the crank-pin. Plugs $j$ $j$ are provided for preventing the balls from falling out of the said holes after they have been placed in position, the said plugs being fixed to the cross-bar $c$ by screws $k$ $k$. The edges of the plate upon which the feet of the rider press are preferably provided with teeth for affording a grip for the feet, or, if desired, the plate $a$ or the edges thereof may be covered with india-rubber.

In order to prevent the pedal or crank-pin $i$ from becoming loose in the crank-arm, (which in the drawings is indicated by the letter $l$,) I advantageously construct them in the following manner—that is to say, I form a portion $m$ of the shank of the crank-pin which enters the arm $l$ conical to fit a corresponding conical portion in the hole of the crank-arm, and I provide the portion of the said shank between the conical portion $m$ and the end of the pin with a screw-thread $n$. The thread $n$ is preferably of the section clearly shown in Fig. 4—that is to say, the threads are preferably vertical on one side and inclined on the other—as I find that this arrangement affords a firmer hold than when the usual V-shaped thread is employed.

Having now particularly described and ascertained the nature of my said invention and in what manner the same is to be performed, I declare that what I claim is—

The combination with the pedal-shaft provided adjacent to its inner end with a cylindrical bearing portion, and adjacent to its outer end with parallel annular grooves, of a pedal having foot-engaging plate, and outer and inner internally-grooved sockets connected to said plate by laterally-extending arms, the inner socket surrounding the said cylindrical bearing portion, and the outer socket having parallel internal grooves in line with the parallel grooves of the shaft, said socket being provided with an aperture in line with each groove for inserting balls into the socket, removable closing devices for said apertures and means for securing said closing devices to the lateral arms of said outer socket to hold them in position to close the said apertures, balls interposed between said inner socket and said cylindrical bearing portion, and balls interposed between the outer socket and said annular grooves of the shaft forming the sole means for preventing the movement of the pedal longitudinally of the shaft, substantially as described.

MIKAEL PEDERSEN.

Witnesses:
G. F. REDFERN,
JOHN E. BOUSFIELD.